(12) United States Patent
Barbieri et al.

(10) Patent No.: US 9,779,164 B2
(45) Date of Patent: Oct. 3, 2017

(54) EASY 2D NAVIGATION OF VIDEO DATABASE

(75) Inventors: Mauro Barbieri, Eindhoven (NL); Serverius Petrus Paulus Pronk, Vught (NL); Jan Korst, Eindhoven (NL)

(73) Assignee: Funke Digital TV Guide GmbH, Berlin (DE)

( * ) Notice: Subject to any disclaimer, the term of this patent is extended or adjusted under 35 U.S.C. 154(b) by 143 days.

(21) Appl. No.: 14/131,283

(22) PCT Filed: Jul. 13, 2012

(86) PCT No.: PCT/EP2012/063842
§ 371 (c)(1),
(2), (4) Date: Jan. 7, 2014

(87) PCT Pub. No.: WO2013/010959
PCT Pub. Date: Jan. 24, 2013

(65) Prior Publication Data
US 2014/0173436 A1    Jun. 19, 2014

(30) Foreign Application Priority Data

Jul. 20, 2011   (EP) .................... 11174748

(51) Int. Cl.
G06F 17/30 (2006.01)
(52) U.S. Cl.
CPC .... G06F 17/3084 (2013.01); G06F 17/30058 (2013.01); G06F 17/30274 (2013.01); G06F 17/30277 (2013.01)
(58) Field of Classification Search
CPC ......... G06F 17/30696; G06F 17/30058; G06F 17/30274; G06F 17/3084; G06F 17/3083; G06F 17/30277
See application file for complete search history.

(56) References Cited

U.S. PATENT DOCUMENTS 8,117,564 B2 *  2/2012  Woods ............... G06T 15/20
                                                        715/721
8,352,465 B1 *  1/2013  Jing ................. G06F 17/30867
                                                        707/723

(Continued)

FOREIGN PATENT DOCUMENTS

CN        1304107      7/2001

OTHER PUBLICATIONS

Snoek et al., The MediaMill TRECVID 2006 Semantic Video Search Engine, Nov. 13-14, 2006, National Institute of Standards and Technology, pp. 1-15.*

(Continued)

*Primary Examiner* — William Bashore
*Assistant Examiner* — Daniel Parcher
(74) *Attorney, Agent, or Firm* — Ware, Fressola, Maguire & Barber LLP

(57) ABSTRACT

A method of operating an apparatus for displaying content items on a display, a corresponding computer program for operating an apparatus and an apparatus for displaying content items on a display that is arranged for being coupled to the apparatus are provided. In particular, an apparatus is configured to display a plurality of content items in a two-dimensional grid in dependence of a respective relatedness between a selected content item and one of the content items to be displayed. The selected content item is positioned at a center of the display and the related content items are displayed such that associated relatedness values decrease both in left, right, up and down direction with respect to the center position. A user terminal that comprises such apparatus is provided.

14 Claims, 2 Drawing Sheets

(56) References Cited

U.S. PATENT DOCUMENTS

| | | | |
|---|---|---|---|
| 2006/0155684 A1 | 7/2006 | Liu et al. | |
| 2007/0186177 A1* | 8/2007 | Both | G06F 3/04817 715/764 |
| 2008/0097975 A1* | 4/2008 | Guay | G06F 17/30265 |
| 2009/0019031 A1* | 1/2009 | Krovitz | G06F 17/30994 |
| 2009/0019348 A1* | 1/2009 | King | G06F 3/0482 715/205 |
| 2011/0040740 A1* | 2/2011 | Nugent | G06F 17/30696 707/706 |
| 2012/0158537 A1* | 6/2012 | Gonsalves | G06Q 30/0643 705/26.7 |
| 2013/0127893 A1* | 5/2013 | Gokturk | G06F 17/3025 345/582 |

OTHER PUBLICATIONS

Worring et al., Mediamill: Advanced Browsing in News Video Archives, Jul. 2006. Image and Video Retrieval 5th International Conference Proceedings, CIVR 2006, Springer, pp. 533-536.*

* cited by examiner

- prior art -

EASY 2D NAVIGATION OF VIDEO DATABASE

CROSS REFERENCE TO RELATED APPLICATIONS

This application is the U.S. National Stage of International Application Number PCT/EP2012/063842 filed on Jul. 13, 2012 which was published in English on Jan. 24, 2013 under International Publication Number WO 2013/010959. This application also claims priority under 35 USC §119 to European Patent Application No. 1174748.1 filed on Jul. 20, 2011. Both applications are hereby incorporated by reference in their entirety.

FIELD OF THE INVENTION

The present invention relates to a method of operating an apparatus for displaying content items on a display, a corresponding computer program for operating an apparatus and to an apparatus for displaying content items on a display that is arranged for being coupled to the apparatus. In particular, the present invention relates to an apparatus that is configured to display a plurality of content items in a two-dimensional grid in dependence of a respective relatedness between a selected content item and one of the content items to be displayed. The invention furthermore relates to a user terminal that comprises such apparatus.

BACKGROUND OF THE INVENTION

The amount of available content items, such as videos, articles, music files, products that can be ordered, blogs etc., increase day by day, such that a user might encounter severe difficulties in finding content items that are of actual interest to him/her. The user may, thus, end up spending a lot of time in browsing and searching for relevant content items.

There are two popular ways of finding content items, namely conventional keyword-based search on the one side and browsing through a content item database by similarity or by relatedness on the other side. In a keyword-based search, a user specifies a query by entering one or more keywords in a search engine and is provided with a list of results matching somehow to the entered keywords. This way of finding content items is suitable if a user has a fairly precise idea of what he/she is looking for.

If, in the other case, a user has not a specific idea of what he/she is looking for, or, respectively, if he/she has already found something of interest and wants to explore the content item database for related or similar content items, then browsing by similarity or by relatedness is performed. For instance, if a user selects one of a plurality of displayed content items on a website of a certain content item database, the website can be organized such that, after selection of the certain content item, the website displays further content items that are similar or related to the selected content item.

In an example, a user browses through a video database, such as YOUTUBE.COM, and watches a video about a FORMULA 1 race. The video database website is often organized such that miniature graphical representations of similar/related videos are displayed in a display area, wherein the user can select one of these similar/related videos for viewing. Many websites of content item databases are organized in a similar manner, e.g., AMAZON.COM or any other website of an online shop.

Some methods of computing a measure of similarity or relatedness between two content items are known. For instance, some approaches are based on metadata about content items, and others are based on co-visitation counts, wherein, e.g., a number of times a user watches two videos in a same viewing session is counted.

A principle of gathering related content items shall now be explained with respect to FIG. 1, wherein the content item type shall be, in this example, a video. For each pair of videos $(v_i, v_{i1 \ldots iN})$, a relatedness score $r(v_i, v_{i1 \ldots iN})$ can be computed. Each video $v_i$ has an associated set of related videos $R_i$ containing top-N videos ranked by their relatedness score $r(v_i, v_{i1 \ldots iN})$. The related videos can be seen as inducing a directed graph over the set of videos. Two videos $v_i$ and $v_{i1 \ldots iN}$ are connected by an edge $e_{i1 \ldots iN}$, if $v_{i1 \ldots iN}$ belongs to the set $R_i$, with the weight of the edge given by the relatedness score $r(v_i, v_{i1 \ldots iN})$.

When browsing by similarity or by relatedness, the user is presented with a list of content items that are related to a selected content item. When selecting another content item from the list of related content items, a new list of related content items is shown, thereby allowing further search for related content items.

United States patent application US 2008/0097975 A1 describes a simulation-assisted search technique. A visually-oriented search system guides a search with non-verbal inputs. Instead of specifying discrete attributes (words) as input to a search engine, a user may create a visual model of a desired end result and apply the model as a generalized input from which discrete attributes are extracted for submission to conventional search engines. The search can apparently be enhanced with a simulation of the visually-created query, and the simulation may be transformed into a query suitable for distribution to one or more search engines. The query may be refined using domain specific rules, vocabulary, expert systems, and the like. Search results may be browsed by a user, or employed to further refine subsequent searches.

United States patent application US 2006/0155684 A1 discloses a method of presenting web image search results for effective image browsing. So-called task-based attention objects for each of multiple images associated with image search results are generated. Thumbnail images from respective ones of the images are created as a function of at least the task-based attention objects. The thumbnail images shall emphasize image region(s) of greater priority to a user in view of a keyword or expanded keyword.

Given the large amount of available content items, the list of related or similar content items being displayed when browsing through a content item database can be rather long and may, thus, not provide a good overview to the user.

SUMMARY OF THE INVENTION

It is a technical object of the present invention to provide technical means for automatically improving an overview of displayed related content items when browsing by similarity or by relatedness.

According to a first aspect of the present invention, the technical object is achieved by a method of operating an apparatus for displaying content items on a display arranged for being coupled to the apparatus, wherein the method comprises the following steps:

receiving an electronic selection command initiated by a user, the selection command designating a content item displayed on the display as having a type of selected status (selected content item), generating a search string in dependence of the selected content item, forwarding the search string to a search engine, the search engine being coupled to a content item database and configured to carry out a content item search based on the search string, receiving search result data from the search engine, the search result data including data pairs that relate to found content items, wherein each of the data pairs includes a respective content item data piece representing a respective content item and a respective associated relatedness value, the respective associated relatedness value indicating a degree of relatedness between the respective content item and the selected content item, defining a two-dimensional grid comprising rows and columns on a display area of the display, wherein a graphical content item representation can be arranged at each intersection field where a column intersects with a row, and arranging graphical representations of the found content items in the two-dimensional grid in dependence of the associated relatedness values, such that a graphical representation of a found content item whose associated relatedness value is the highest of relatedness values associated to found content items to be displayed in a common column of the grid is arranged at a centered intersection field being centered in the common column.

The present invention includes the recognition that according to prior art displaying mechanisms, related content items are usually presented in an one-dimensional manner, wherein a top-ranked related content item is arranged in the first position and content items considered less related are arranged linearly after the top-ranked content item. However, this approach does not provide a good overview of content items available and it does not provide enough visual structure for users to orientate themselves and navigate effectively and easily. Therefore, according to prior art displaying mechanism, a user eventually spends a lot of time browsing, thereby causing energy consumption and increased network load, as some processing means that operate a respective content item database have to process each search inquiry initiated by the user. For example, after having selected a certain video and having browsed through a couple of lists of related videos, it is difficult for the user to return to the video from which he/she had originally started browsing. These issues become even more serious when accessing a content item database from a device that does not support a point-and-click paradigm, such as TV-sets with standard remote controls, i.e. up-, down-, left-, right-commands only.

Due to the representation of found content items in the two-dimensional (2D) grid, the operating method allows for easy navigation through related content items, in particular with a standard television (TV) remote control. According to the operating method, a display area is reserved for the two-dimensional grid comprising the rows and columns yielding a matrix (or tabular or array) like structure. Each column of this structure includes a column group of related content items, wherein the found content item whose associated relatedness value is the highest with respect to the relatedness values associated to the found content items of the column group is arranged in a centered position of the respective column. Thus, content items of the column group whose associated relatedness values are less than the relatedness value of the content item graphically represented at the center position are arranged at an upper and at a lower position with respect to this center position. This manner of arranging found content items provides a very organized overview and a visual structure to the user browsing by relatedness or by similarity. Therefore, browsing is more convenient for a user, as a user can quickly find content items of interest to him/her. Also, the time a user is operating the apparatus for finding content items can be reduced, which leads to energy saving and a significant reduction of network load on the side of the content item database. The energy saving aspect is in particular relevant for mobile devices that are driven by battery.

Furthermore, the two-dimensional grid is built in such a way that it provides easy access to closely related content items as well as content items that are less closely related. This enables the discovery of less closely related but interesting content items, which would not be easily found by scrolling through a one-dimensional list of related content items, as the less closely related content items would be typically positioned in the later or last positions of the one-dimensional list.

It shall be understood that the associated relatedness values included in the data pairs provided by the search engine do not have to be present in a separate data word, but can be delivered by the search engine implicitly, e.g., in the form of a list. Such list can include, in a first list position, a content item data piece representing a content item with a highest relatedness degree and further content item data pieces in subsequent list position exhibiting a respective diminished relatedness degrees or, respectively, the list begins with a content item exhibiting a lowest relatedness degree and content items of subsequent list positions have respective increased relatedness degrees. Thus, the associated relatedness values can be encoded in list positions of the search result data delivered in the form of a list. It is not mandatory for carrying out the invention that actual values in the form of numerical numbers are delivered by the search engine. Rather, values can be encoded in a list ordered by relevance and/or relatedness. Such delivery of search result data is common for many known search engines and such delivery does not have to be modified in order to allow for representing the content items on the display with use of the claimed method in the described manner.

The apparatus to be operated can be integrated in any kind of a user terminal, such as a mobile terminal, such as a mobile phone or a smartphone, a personal computer, a notebook, a television system, a set-top box, a multimedia player, an internet video portal, etc.

The electronic selection command initiated by the user can be input, for instance, through a remote control, such as a conventional TV remote control, or by a mouse through a "point-and-click" mechanism, via a touch screen and so on. It is recognized which content item is selected and a search string is generated in response to this recognition. A search is implemented based on the generated search string using a search engine. The search string can be based on metadata of the selected content item. For instance, the search engine performs a search for related or similar content items. The content item database coupled to the search engine can also be personal channel of the user, the personal channel storing personal channel data pieces indicative of preferred content of the user. Within the scope of the description of the present invention, the wording "content item" can also mean such personal channel data piece.

Within the scope of the description of the present invention, the wording "relatedness" is supposed to follow its standard definition within recommender technology. Thus, the notion "relatedness" can mean similarity between two content items; however, there can also be some other kind of relatedness, e.g., economical relatedness or a relatedness that is deducted from a user account, a user behaviour and/or deducted from similarities between users and so on. I shall be understood, though, that the present invention rather focuses on displaying related content items than on mechanisms for retrieving related content items.

The found content items are represented by data pairs, wherein each of these includes a data representation of one of the found content items and a respective associated relatedness value. The present invention includes the idea of converting the graph of related content items mentioned in the background of the invention into the two-dimensional grid that is easy to navigate through. The set-up and the content of the two-dimensional grid is dependent on the selected content item that was selected prior to the creation of the two-dimensional grid.

It is preferred that the selected content item is also represented in the two-dimensional grid. Depending on the selected content item, a column of the selected content item can be either kept empty or filled with other representations of content items. For instance, if the two-dimensional grid is used to represent a personal channel, the column of the selected content item can be filled with the content of the personal channel. If the two-dimensional grid shows the result of a search of a content item database, the initial central column can be filled with results of the search.

In an embodiment, the operating method includes the additional step of arranging a graphical representation of the selected content item at a center position of the two-dimensional grid.

The center position of the two-dimensional grid is preferentially centered with respect to a vertical and horizontal direction. Therefore, the user is confronted with a visual representation of found content items, wherein the initially selected content item is represented at a center and all the other related content items are represented in a manner, wherein the respective associated relatedness values decrease both in left and right direction and in up and down direction. This way of representing found related content items makes it very easy for the user to follow even subliminal interests that the user is incapable of verbalizing, as he can now easily navigate through content items based on his visual impression only. In the outcome, such graphical representation allows a electrical energy and time efficient way of finding content items of interest. Therefore, the user will eventually spend less time operating the apparatus, thereby significantly reducing energy consumption and network load.

In a particularly preferred embodiment, the operating method includes the steps of:
  applying a clustering algorithm to the search result data for clustering the found content items into a plurality of clusters in dependence of a similarity of the found content items, and
  associating each cluster to a respective of the columns, wherein the graphical representations of the found content items are arranged such that each column of the two-dimensional grid includes graphical representations of found content items that belong to a respective associated cluster.

It shall be understood that the arranging step of the operating method can be applied to rows instead of columns, e.g., depending on a point of view of the user.

In this embodiment, the centered row thus includes a plurality of cluster representative content items. Therefore, by navigating in a horizontal direction, the user can skip from cluster to cluster and by navigating in a vertical direction, the user can browse through a respective cluster.

In an example, the user selects a video as a selected content item. At first, a set of related videos is retrieved. Next, the videos of the set of related videos are divided into N clusters depending on their similarity. As mentioned introductory, the notion of relatedness can comprise other aspects of similarity, such as user account aspects, economically relatedness and so on. Different clustering algorithms can be applied, wherein, in a preferred embodiment, the cluster algorithm includes at least one of a K-means clustering algorithm, a hierarchical clustering algorithm, a spectral clustering algorithm, or a combination thereof. For each cluster, one cluster-representative video is chosen and displayed in the same row as the selected video. Graphical representations of the other videos belonging to the cluster are inserted in the columns corresponding to their cluster-representative video. It shall be understood, that the clustering algorithm can certainly be applied, if other content item types than videos are searched for. Moving in the horizontal direction on the two-dimensional grid allows discovering entire categories of related videos, while moving along the vertical direction allows exploring the content of a cluster.

In an embodiment, the graphical representation of the selected content item is arranged at a column centered with respect to the two-dimensional grid and wherein the centered column includes only the graphical representation of the selected content item.

In this embodiment, the overview of the two-dimensional grid is furthermore improved, as the user can easily detect which content item is the selected content item.

Taking into account that it is preferred that the selected content item is represented at a center, in a preferred embodiment, the graphical representations of the found content items are arranged such that a row centered with respect to the two-dimensional grid includes the graphical representation of the selected content item and graphical representations of found content items whose associated relatedness values decrease both in a left and in a right direction with respect to the graphical representation of the selected content items.

In this preferred embodiment, the relatedness value decreases both in a left and in a right direction, thereby deviating from a linear displaying of content items and allowing for an approved overview. For instance, the selected content item being represented at a center position has as its first right neighbour a content item representation of a content item whose associated relatedness value is the highest. As its first left neighbour, there is arranged a representation of content item who's associated relatedness value is a second highest. As a second right neighbour of the centered selected content item representation there is positioned a representation of a content item who's associated relatedness value is the third highest among the found content items. This manner of representation is preferentially preserved throughout the entire center row and correspondingly in each columns.

In view of the preferred position of the representation of the selected content item being at a center position, it is preferred that the two-dimensional grid includes an uneven number of rows and an uneven number of columns.

In a particular preferred embodiment, the operating method comprises the additional steps of:
  receiving an electronic position command initiated by a user, and designating one of the found content items displayed in the two-dimensional grid as having a type of marked status (marked content item) by adding a graphical mark to the marked content item.

This embodiment is particular preferred, if the user enters his commands through a conventional remote control comprising buttons for submitting a move-right command, a move-left command, a move-up command, and a move-down command. This embodiment ensures that the user can easily navigate through the displayed content items, as he can see the actual position of a cursor. This allows for easy submission of a further electronic selection command, e.g., submitted with an "o.k."/"Enter" button on a remote control, wherein this further selection command designates the marked content item as having the type of selected status. Thereby, the user can easily select a new content item and, in a preferred embodiment, the operating method comprises the additional step of rearranging the graphical representation in dependence of the further selection command.

In particular, the two-dimensional grid is rearranged, such that the newly selected content item assumes the center position and a new search is performed based on the selected content item and the newly found content items are displayed in the two-dimensional grid in manner as explained above. The selected content item can thus be changed by using the conventional four arrow keys on a remote control. By pressing one of the four arrow keys, a newly content item can be marked, e.g., highlighted, and then selected, wherein set-up and content of the two-dimensional grid content is adapted after selection of the highlighted/marked content item to bring the newly selected content item into the center of the two-dimensional grid. Accordingly, the two-dimensional grid is refilled depending on the newly selected content item. For instance, in the centered row of the selected content item, representations of new cluster representatives are inserted, and in the columns, content item representations of content items of respective cluster are inserted.

The operating method of the first aspect of the present invention facilitates in particular browsing through a video item database. It shall be understood, though, that the content items do not have to be of the same type. For instance, it is possible to display both graphical representations of books, articles, videos, documents, blogs, products, music files etc., if a corresponding relatedness between the content items is high enough. In other words, the search engine can be coupled to a plurality of different content item databases for retrieving relevant related content items. If the search engine has retrieved content items from two different content item databases, the method comprises, in an embodiment, the step of mapping the found content items in two different directions in the grid, for instance content items representing TV programs can be mapped in columns, while related internet videos can be inserted into rows.

According to a second aspect of the present invention, the above identified technical object is achieved by a computer program for operating an apparatus for displaying content items on a display arranged for being coupled to the apparatus, the computer program comprising program code means for causing the apparatus to carry out the steps of the method of the first aspect of the invention, when the computer program is run on a computer controlling the apparatus.

The computer program of the second aspect of the invention may be stored/distributed on a suitable medium, such as an optical storage medium or a solid-state medium supplied together with or as part of other hardware, but may also be distributed in other forms, such as via the Internet or other wired or wireless telecommunication systems.

According to a third aspect of the present invention, the above identified object is achieved by an apparatus for displaying content items on a display arranged for being coupled to the apparatus, the apparatus comprising:

an input configured to receive an electronic selection command initiated by a user, the selection command designating a content item displayed on the display as having a type of selected status (selected content item), a search string generator configured to generate a search string in dependence of the selected content item, a sender configured to forward the search string to a search engine, the search engine being coupled to a content item database and configured to carry out a content item search based on the search string, a receiver configured to receive search result data from the search engine, the search result data including data pairs that relate to found content items, wherein each of the data pairs includes a respective content item data piece representing a respective content item and a respective associated relatedness value, the respective associated relatedness value indicating a degree of relatedness between the respective content item and the selected content item, a display driver unit configured to define a two-dimensional grid comprising rows and columns on a display area of the display, wherein a graphical content item representation can be arranged at each intersection field where a column intersects with a row, and to arrange graphical representations of the found content items in the two-dimensional grid in dependence of the associated relatedness values, such that a graphical representation of a found content item whose associated relatedness value is the highest of relatedness values associated to found content items to be displayed in a column is arranged at a centered intersection field being centered in the common column.

The apparatus of a third aspect of the present invention principally shares the advantages of the operating method of the first aspect of the present invention. In particular, the apparatus of the third aspect has preferred embodiments that correspond to the steps of the preferred embodiments of the operating method of the first aspect described above. The apparatus of the third aspect of the present invention can be operated with an operating method of the first aspect of the present invention. In other words, the apparatus of the third aspect of the invention can implement the operating method of the first aspect of the invention.

According to a fourth aspect of the present invention, the above identified object is achieved by a user terminal for internet browsing, the user terminal comprising:

a user interface configured to receive a user command, a display configured to display internet websites, and an apparatus in accordance with the fourth aspect of the invention, wherein the apparatus is coupled to the user interface and to the display.

All aspects of the invention can be applied in the context of a social network consisting of PCs, set-top boxes, et cetera. On such devices, a recommender technology can be installed. An application of an aspect of the invention increases the usability and user satisfaction of such recommenders. More specifically, they can be integrated into the personal channel concept that is believed to offer the ease-of-use that users are used to.

It shall be understood that the operating method of the first aspect of the invention, the computer program of the second aspect of the invention, the apparatus of the third aspect of the invention and the user terminal of the fourth aspect of the invention have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DESCRIPTION OF EMBODIMENTS

Figure 1:
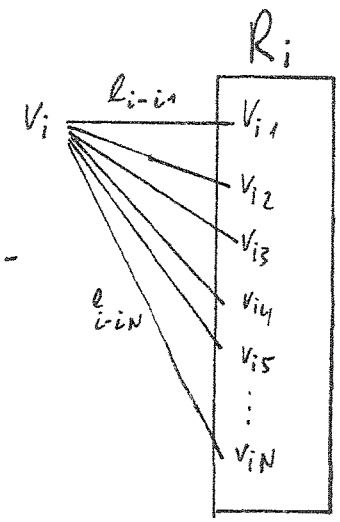
FIG. 1 shows a schematic graphical representation of a selected content item and related content items.
Figure 2:
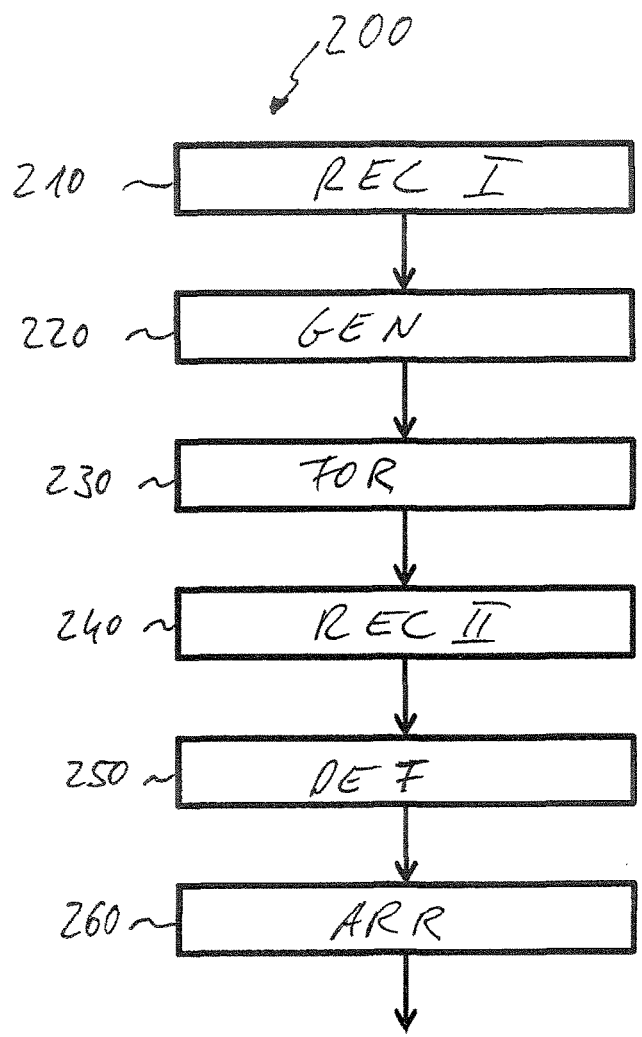
FIG. 2 shows a flowchart illustrating an operating method in accordance with a first aspect of the invention.

FIG. 2 shows a flowchart illustrating an operating method 200 in accordance with a first aspect of the invention. The method 200 is a method for operating an apparatus for displaying content items on a display arranged for being coupled to the apparatus.

In a first step 210, an electronic selection command initiated by a user is received, wherein the selection command designates a content item displayed on the display as having a type of selected status, in the following referred to as selected content item.

In a second step 220, a search string is generated in dependence of the selected content item. In a following third step 230, the search string is forwarded to a search engine that is coupled to a content item database and that carries out a content item search based on the search string.

In a fourth step 240, search result data from the search engine is received, wherein the search result data includes data pairs that relate to found content items. Each of the data pairs includes a respective content item data piece representing a respective content item and a respective associated relatedness value, the respective associated relatedness value indicating a degree of relatedness between the respective content item and the selected content item.

Figure 3:
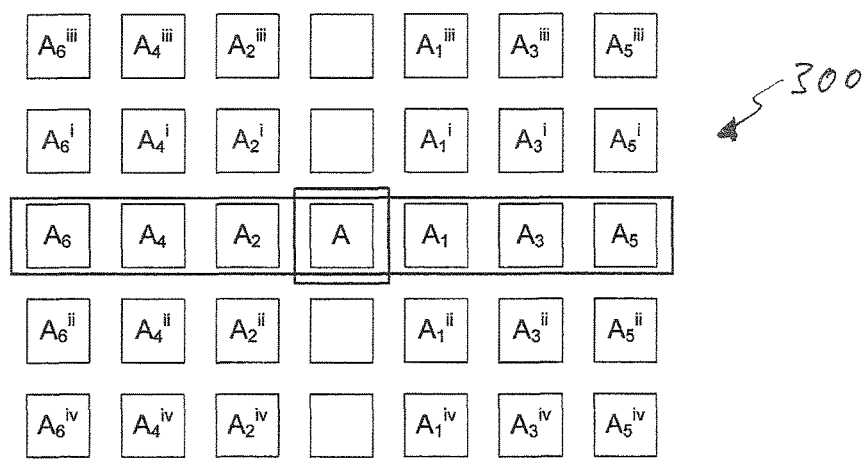
FIG. 3 shows a schematic representation of a two-dimensional grid for displaying related content items.

In a fifth step 250, a two-dimensional grid comprising rows and columns on a display area of the display is defined, e.g., a two-dimensional grid 300 as depicted in FIG. 3, wherein a graphical content item representation can be arranged at each intersection field where a column intersects with a row. This step can include reservation of a certain display part of the display for displaying the found content items, e.g. by communicating with a display to driver driving the display.

In a sixth step 260 graphical representations of the found content items are arranged in the two-dimensional grid in dependence of the associated relatedness values, such that a graphical representation of a found content item whose associated relatedness value is the highest of relatedness values associated to found content items to be displayed in a common column is arranged at a centered intersection field being centered in the common column.

In the following, an example is described with respect to FIG. 2 and FIG. 3: A user has selected content item A while browsing through a content item database, e.g. a video database. According to the operating method 200, it is searched for related content items being related to content item A through a search engine. The search engine delivers at least content items $A_1$ to $A_6^{iv}$ and associated relatedness values as depicted in FIG. 3. A clustering algorithm is applied to the found content items, yielding clusters according to cluster representatives $A_1$ to $A_6$. Each cluster is associated to one of the columns of the grid 300, wherein the graphical representations of the found content items are arranged such that each column of the two-dimensional grid includes graphical representations of found content items that belong to a respective associated cluster. The center row includes, among a representation of the selected content item A, representations of cluster representative content items $A_1$, $A_2$, $A_3$, $A_4$, $A_5$ and $A_6$, the last mentioned content items are each the content item exhibiting the highest degree of relatedness to content item A with respect to their respective cluster. In each column, the degree of relatedness decreases both in up and down direction.

In the two-dimensional grid 300, there is always one selected content item. The selected content item can be changed by the user, e.g., by using a TV remote control or by using a computer mouse. The grid content is adapted to bring the newly selected video in the centre of the grid, wherein this adapting/rearranging step includes the generating step, the forwarding step, the receiving step, the defining step and the arranging step as elucidated above.

Given a selected content item, first a set of related content items is calculated or retrieved. Next, the content items of the set are divided into N clusters depending on their similarity. Different clustering algorithms can be used such as K-means clustering, hierarchical clustering, spectral clustering, etc. For each cluster, one cluster-representative content item is chosen and displayed in the same row as the selected content item. The other content items belonging to a respective cluster are inserted in the columns corresponding to their cluster-representative content item.

The row corresponding to the selected content item is filled with cluster-representative content items $A_1$ to $A_6$. Cluster-representative content items can be content items that are automatically selected as being representative for an entire cluster of related content items.

Moving in the horizontal direction on the grid allows discovering entire categories of related content items while moving along the vertical direction allow exploring the content of a cluster.

The content of the grid is dependent on the initial content item that was selected to create the grid. Depending on the origin of the first content item, the column of the first content item can be either left empty or filled with other content item. For example, if the grid is used to represent a personal channel, the column of A is filled with the content of the personal channel. If the grid shows the results of a search, the initial central column is filled with the results of the search.

Figure 4:
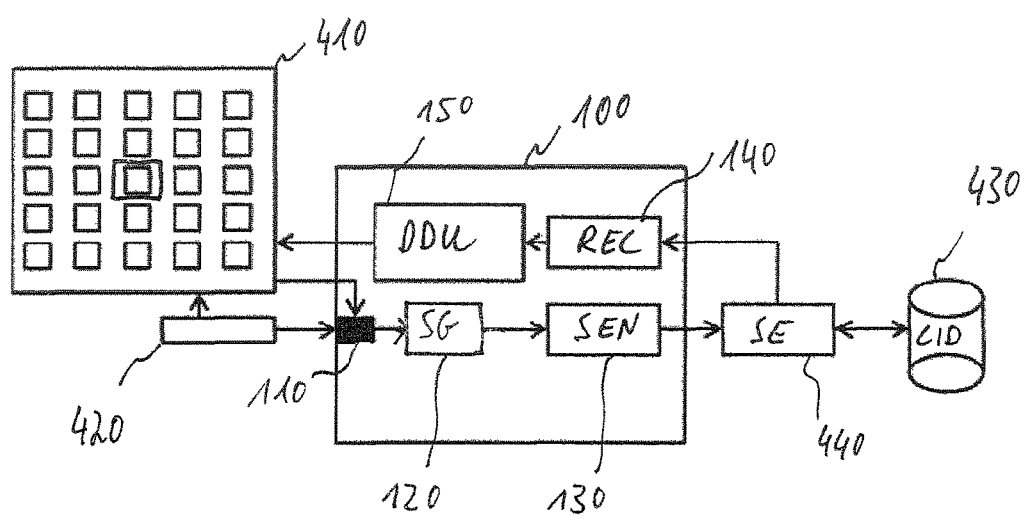
FIG. 4 shows exemplary and schematically a block diagram representation of a to user terminal for internet browsing in accordance with the fourth aspect of the present invention.

FIG. 4 shows exemplary and schematically a block diagram representation of a user terminal 400 for internet browsing in accordance with the fourth aspect of the present invention. However, the terminal 400 can also be used for browsing through a personal channel. The terminal 400 can be a personal computer, a TV-set, a mobile phone, a smart phone, a laptop, a personal digital assistant, a notebook, a set-top box etc. Websites visited by the user (not shown) are displayed on a display 410 of the terminal 400. The user can enter commands through a user interface 420. For instance, the user interface is a remote control or a touch screen embedded in display 410 or a computer mouse or microphone arrangement for voice commands.

For displaying content items in a two-dimensional grid, for instance as indicated in FIG. 3 and suggested in FIG. 4, the terminal comprises an apparatus 100. The apparatus is coupled to the user interface 420 and to the display 410 on the one side and to a search engine 440 on the other side. The search engine can be implemented on a remote server of the internet.

The apparatus 100 comprises an input 110 that receives an electronic selection command initiated by a user. The selection command designates a content item displayed on the display 410 as having a type of selected status, in the following referred to as selected content item.

Based on the selected content item, a search string generator 120 of the apparatus 100 generates a search string and forwards this string to a sender 130. The sender transmits the search string the search engine 440 that carries out a content item search within at least one content item database 430 correspondingly. As indicated, the selected content item can also be an item of a personal channel of the user. In this case, the search engine and the content item database (e.g. electronic program guide data) can be internally implemented in the apparatus 100. If, however, the content item data base is a video or product data base, such as YOUTUBE.COM or AMAZON.COM, the search engine is rather implemented on a server that administrates the content item database.

A receiver 140 of the apparatus 100 receives search result data from the search engine 440. The sender 130 and the receiver 140 can be united to an internet communication unit that fulfils the sending and receiving function explained above. For instance, sender 130 and receiver 140 are implemented in a conventional internet interface, e.g., the apparatus 100 can be wirelessly coupled to the internet, in particular wirelessly coupled to the search engine.

The search result data include data pairs that relate to found content items, wherein each of the data pairs includes a respective content item data piece representing a respective content item and a respective associated relatedness value, the respective associated relatedness value indicating a degree of relatedness between the respective content item and the selected content item.

The receiver 140 passes the result data to a display driver unit 150. The display driver unit drives the display 410. After or before having received the search result data, it defines a two-dimensional grid in a display area, e.g. according to FIG. 3, wherein a graphical content item representation can be arranged at each intersection field where a column intersects with a row.

The display driver unit arranges graphical representations of the found content items in the two-dimensional grid in dependence of the associated relatedness values, such that a graphical representation of a found content item whose associated relatedness value is the highest of relatedness values associated to found content items to be displayed in a common column is arranged at a centered intersection field being centered in the common column.

Concerning the arrangement possibilities of arranging the representations of content items, it is referred to the description of the operating method 200 according to FIG. 2. The display driver unit 150 of the apparatus 100 can operate accordingly. In particular, the apparatus 100 allows the user to navigate through the displayed content items and reacts to a selection of a new content item by initiating a new content item search and rearranging the displayed content items, in particular centering the newly selected content item and rearranging the related content item as described above with respect to the operating method.

It shall be understood that an arrangement of elements of a respective figure predominately serves a purpose of an evident description; it does not relate to any actual geometric arrangement of parts of a manufactured apparatus/device according to the invention.

In the claims, the word "comprising" does not exclude other elements or steps, and the indefinite article "a" or "an" does not exclude a plurality.

A single unit or device may fulfil the functions of several items recited in the claims. The mere fact that certain measures are recited in mutually different dependent claims does not indicate that a combination of these measures cannot be used to advantage. Any reference signs in the claims should not be construed as limiting the scope.

The computer program of the second aspect of the invention may be stored/distributed on a suitable medium, such as an optical storage medium or a solid-state medium supplied together with or as part of other hardware, but may also be distributed in other forms, such as via the Internet or other wired or wireless telecommunication systems.

What is claimed is:

1. A method of operating an apparatus for displaying content items on a display arranged for being coupled to the apparatus, the method comprising the steps of:

receiving an electronic selection command initiated by a user, the selection command designating a content item displayed on the display as a selected content item, generating a search string in dependence of the selected content item, forwarding the search string to a search engine, the search engine being coupled to a content item database and configured to carry out a content item search based on the search string, receiving search result data from the search engine, the search result data including data pairs that relate to found content items, wherein each of the data pairs includes a respective content item data piece representing a respective content item and a respective associated relatedness value, the respective associated relatedness value indicating a degree of relatedness between the respective content item and the selected content item, defining a two-dimensional grid comprising a plurality of rows and columns on a display area of the display, wherein a graphical content item representation can be arranged at each intersection field where a column intersects with a row, arranging graphical representations of the found content items in the two-dimensional grid in dependence of the associated relatedness values, such that a graphical representation of a found content item whose associated relatedness value is the highest of relatedness values associated to found content items to be displayed in a common column is arranged at a centered intersection field being centered in the common column, and arranging a graphical representation of the selected content item at a center position of the two-dimensional grid, wherein the selected content item is from a list of content results previously shown to the user,
wherein the graphical representation of the selected content item is arranged at a column centered with respect to the two-dimensional grid and wherein the centered column includes only the graphical representation of the selected content item at a row centered with respect to the two-dimensional grid, and wherein the remainder of the centered column is empty.

2. The method of claim 1, comprising the additional steps of:
applying a clustering algorithm to the search result data for clustering the found content items into a plurality of clusters in dependence of a similarity of the found content items, and
associating each cluster to a respective one of the plurality of columns, wherein the graphical representations of the found content items are arranged such that each column of the two-dimensional grid includes graphical representations of found content items that belong to a respective associated cluster.

3. The method of claim 2, wherein the cluster algorithm includes at least one of a K-means clustering algorithm, a hierarchical clustering algorithm, a spectral clustering algorithm, or a combination thereof.

4. The method of claim 1, wherein the graphical representations of the found content items are arranged such that a row centered with respect to the two-dimensional grid includes the graphical representation of the selected content item and graphical representations of found content items whose associated relatedness values decrease both in a left and in a right direction with respect to the graphical representation of the selected content items.

5. The method of claim 1, wherein the two-dimensional grid includes an uneven number of rows and an uneven number of columns.

6. The method of claim 1, comprising the additional steps of:
receiving an electronic position command initiated by a user, and
designating one of the found content items displayed in the two-dimensional grid as a marked content item having a type of marked status by adding a graphical mark to the marked content item.

7. The method of claim 6, wherein the position command includes at least one of a move-right command, a move-left command, a move-up command, a move-down command, or a combination thereof.

8. The method of claim 7, additional comprising the additional steps of:
receiving a further electronic selection command, the further selection command designating the marked content item as having the type of selected status, and
re-arranging the graphical representations in dependence of the further selection command.

9. The method of claim 6, additional comprising the additional steps of:
receiving a further electronic selection command, the further selection command designating the marked content item as having the type of selected status, and
re-arranging the graphical representations in dependence of the further selection command.

10. An apparatus configured to store a computer program for operating the apparatus for displaying content items on a display arranged for being coupled to the apparatus, the computer program comprising program code means for causing the apparatus to carry out the steps of one of the method as defined in claim 1, when the computer program is run on a computer controlling the apparatus.

11. The method of claim 1, comprising the additional steps of:
applying a clustering algorithm to the search result data for clustering the found content items into a plurality of clusters in dependence of a similarity of the found content items, and
associating each cluster to a respective of the columns, wherein the graphical representations of the found content items are arranged such that each column of the two-dimensional grid includes graphical representations of found content items that belong to a respective associated cluster.

12. The method of claim 1, wherein the cluster algorithm includes at least one of a K-means clustering algorithm, a hierarchical clustering algorithm, a spectral clustering algorithm, or a combination thereof.

13. An apparatus for displaying content items on a display arranged for being coupled to the apparatus, the apparatus comprising:
an input module configured to receive an electronic selection command initiated by a user, the selection command designating a content item displayed on the display as a selected content item,
a search string generator configured to generate a search string in dependence of the selected content item,
a sender configured to forward the search string to a search engine, the search engine being coupled to a content item database and configured to carry out a content item search based on the search string,
a receiver configured to receive search result data from the search engine, the search result data including data pairs that relate to found content items, wherein each of the data pairs includes a respective content item data piece representing a respective content item and a respective associated relatedness value, the respective associated relatedness value indicating a degree of relatedness between the respective content item and the selected content item,
a display driver unit configured
to define a two-dimensional grid comprising a plurality of rows and columns on a display area of the display, wherein a graphical content item representation can be arranged at each intersection field where a column intersects with a row,
to arrange graphical representations of the found content items in the two-dimensional grid in dependence of the associated relatedness values, such that a graphical representation of a found content item whose associated relatedness value is the highest of relatedness values associated to found content items to be displayed in a common column is arranged at a centered intersection field being centered in the common column, and
to arrange a graphical representation of the selected content item at a center position of the two-dimensional grid, wherein the selected content item is an item from a list of content results previously shown to the user,
wherein the graphical representation of the selected content item is arranged at a column centered with respect to the two-dimensional grid and wherein the centered column includes only the graphical representation of the selected content item at a row centered with respect to the two-dimensional grid, and wherein the remainder of the centered column is empty.

14. A user terminal for internet browsing, the user terminal comprising:
   a user interface configured to receive a user command,
   a display configured to display internet websites, and
   an apparatus according to claim 13, wherein the apparatus is coupled to the user interface and to the display.

* * * * *